United States Patent [19]

Weiss

[11] 4,214,878
[45] Jul. 29, 1980

[54] FILTERING APPARATUS AND METHODS OF EXCHANGING PARTICULATE FILTER MATERIALS

[76] Inventor: Viktor Weiss, Grillparzerstrasse 21, Graz, Austria

[21] Appl. No.: 909,484

[22] Filed: May 25, 1978

[30] Foreign Application Priority Data

May 26, 1977 [DE] Fed. Rep. of Germany ....... 2723885
May 11, 1978 [DE] Fed. Rep. of Germany ....... 2820650

[51] Int. Cl.$^2$ ...................... B01D 41/02; B01D 46/30
[52] U.S. Cl. ........................................ 55/96; 55/98; 55/272; 55/289; 55/291; 55/296; 55/432; 55/466; 55/474; 55/479
[58] Field of Search ...................... 55/96, 98, 99, 272, 55/288, 289, 291, 295, 296, 432, 433, 466, 474, 479, 518, 522, DIG. 16

[56] References Cited

U.S. PATENT DOCUMENTS

| 2,661,811 | 12/1953 | Kautz | 55/296 |
|---|---|---|---|
| 3,545,178 | 12/1970 | Sheehan | 55/272 |
| 3,800,508 | 4/1974 | Zenz | 55/432 |
| 3,912,466 | 10/1975 | Zenz | 55/96 |
| 3,917,458 | 11/1975 | Polak | 55/474 |
| 4,033,117 | 7/1977 | Smith | 55/96 |

FOREIGN PATENT DOCUMENTS

| 363095 | 11/1918 | Fed. Rep. of Germany | 55/479 |
|---|---|---|---|
| 184869 | 6/1936 | Switzerland | 55/296 |
| 390815 | 11/1973 | U.S.S.R. | 55/291 |
| 488601 | 3/1976 | U.S.S.R. | 55/98 |

*Primary Examiner*—David L. Lacey
*Attorney, Agent, or Firm*—Toren, McGeady and Stanger

[57] ABSTRACT

A filtering apparatus for filtering a fluid comprises two coaxial walls which are provided with openings for the radially-outward passage of the fluid to be filtered, granular filtering material being disposed between the walls. The fluid to be filtered is fed into the space bounded by the inner wall and the filtered fluid is abstracted from an annular chamber disposed about the outer wall. The inner wall is formed from a series of annular inclined vanes. A rotary shaft disposed coaxially within the inner wall carries blades which project between the vanes. The blades scrape deposited matter from the vanes and also scrape the radially innermost parts of the granular filter material from between the vanes. In accordance with the method of the invention, the filter material is emptied periodically from between the walls and this emptied material and the material removed by the blades is carried to a treating station for regeneration and re-cycling to the upper end of the space between the walls. During emptying, a flow of air is passed in counter-current to the normal direction of flow through the filter material to prevent unfiltered fluid from reaching the annular chamber.

12 Claims, 3 Drawing Figures

FILTERING APPARATUS AND METHODS OF EXCHANGING PARTICULATE FILTER MATERIALS

The invention relates to a method of exchanging a particulate filter material forming the filling of a filter used in a gas-cleaning plant and to apparatus for performing the method.

In a known method described in Swiss Pat. Specification No. 68,323 it is not possible, when removing the used-up filter material, to prevent the dust deposited therein from passing through the perforated boundary faces of the filter to the clean-gas side as well as the crude-gas side, and from forming a dense cloud in each of these two compartments so that when filtering, i.e. cleaning, is resumed after the voiding and charging operation, the dust is discharged with the clean gas. Thereafter, following each cleaning operation, a cloud of dust issues from the chimney and pollutes the atmosphere. In the case of an industrial filter used, for example, in a rotary cement kiln and in which a filter consists of approximately 10-20 compartments and the cleaning cycle of each compartment has to take place every 30 to 60 minutes, troublesome polluting clouds of dust are discharged into the surrounding atmosphere at intervals of only a few minutes.

The object of the present invention is, therefore, to provide an improved method which assists in preventing the discharge of dust and which enables the filter material to be used over a fairly lengthy period, i.e. requiring it to be exchanged less frequently.

This object is achieved in an exchange method of the initially stated kind by a combination of the following features: for the purpose of cleaning the filter material, the filter layer on the crude gas side in the crude gas side filter compartment is periodically mechanically removed and is discharged from said compartment through a discharge opening; the discharged filter material is replaced from a supply compartment or container; the entire filter material is discharged from the filter compartments, accommodating the filter material, through a discharge opening, after a plurality of cleaning cycles, an air current, counter to the direction of flow of the gas to be cleaned, being passed through the filter into the clean gas side during each cleaning cycle and the periodic voiding, for the purpose of preventing the entry of dust through the filter into the clean gas side; and the voided filter material is subjected to regeneration and thereafter is returned to the gas cleaning plant, the several steps of the method, namely cleaning, voiding, regeneration and refilling, being controlled by means of a programmed circuit.

In the method of the invention, the layer of filter material that becomes contaminated most rapidly and to the greatest extent is removed from the cell by means of the cleaning elements so that only this quantity of filter material is required to be replaced by fresh filter material. At the same time, the cell wall that is subjected to the greatest contamination, i.e. the wall comprising the interiorly disposed lamellar elements is cleaned so that the crude gas glowing outwardly through the cell can pass through the cleaned inner wall without any great loss of flow, and can penetrate into the fresh filter medium. The filter material removed by means of the cleaning elements can fall without causing any trouble and can be removed from the filtering plant through a suitable discharge lock or opening, after which it is passed on for regeneration. Because of the periodic voiding and regeneration, the layers that are not mechanically cleaned are also renewed, and the application of an air counter-current prevents entry of dust into the clean-gas section.

The inner layer of filter material mechanically cleaned in this manner has a thickness of approximately 1 to 2 cm. The filter material already present in the filter cell shifts downwardly after removal of the discharged filter material and completes the angle of repose of the filter material between the lamellar elements likewise cleaned during the cleaning operation. For the purpose of this intermediate cleaning it will generally suffice to use a single cycle of movement in which the cleaning elements move once along the inner wall of the cell or along the lamellar elements of the inner wall. When a filter is heavily contaminated, two or more movement cycles of the cleaning elements may be expedient.

It has already been proposed in German Pat. Specification No. 2,418,003 to effect a complete exchange of the particular filter material, the composition of which is suited to the dust or waste gases to be treated, after a certain degree of contamination has been reached, and to replace it by clean, i.e. either fresh or cleaned, filter material, a stream of air, flowing counter to the direction of flow of the gas to be cleaned, being passed through the filter to prevent entry of dust into the clean gas side. When operating this filtering installation it has been found that, although the exchange can be carried out without problems, on the one hand, extension of the period of use of the filter material is desirable and on the other, exchange of the entire filter medium is absolutely necessary in all cases.

It has also been proposed to arrange the filter layer in annular compartments arranged one above the other in stepped formation, the inner cylindrical surface that delimits each annular chamber being open in part, and the filter material assuming a slope, corresponding to its angle of repose, on a platform disposed below the opening. The filter material most heavily laden with dust is peeled off with the aid of scrapers. Although this can result in a longer service life of the filter material, the stepped arrangement of the annular chambers entails disadvantages which consist, in particular, in the formation of a non-exchangeable cone of filter material and a thickness of film material that is uneven over the cross-section.

It is also known, in the cleaning of filters which are cleaned by flushing with air, to move the filter material in the cell with the aid of mechanical stirring devices so as to loosen the deposited particles mechanically from the filter material so that the air used for flushing is able to carry the detached deposits from the filter to the crude-gas side. In contrast to this, the cleaning elements of the invention are used to remove intermittently, from the cell filter, material of the layer that is contaminated most rapidly, together with the deposited dust, and at the same time to clean the adjacent cell wall which likewise is subjected to the greatest degree of contamination.

When performing the method, it is particularly advantageous to preheat the countercurrent air which is passed through the filter compartment to approximately 150° to 200° C. This is done so as to prevent the corrosive vapours contained in the waste gas from falling below their dew points and thus to prevent corrosion.

By closing off the clean-gas side from the filter chamber by means of a shut-off member, entry of dust into the clean-gas section is prevented in a still more reliable manner.

The filter material may advantageously consist of unbroken sintered magnesite particles having a diameter of 1 to 8 mm and preferably 2 to 6 mm. This substance is a naturally particulate material which is particularly suitable for withstanding thermal loads of up to 500° C.

Escape of filter dust may be further prevented by means of a closed conveying system extending over both of the zones over which the filter chamber and the regenerating system are connected to each other.

Advantageously, the method of the invention is performed by means of an apparatus comprising a cell having two coaxial gas-permeable walls, the inner wall consisting of annular coaxial lamellar elements extending obliquely upwards at an angle of 35°, and forming an annular filter compartment, through which the gas to be cleaned flows outwardly and which is filled with the particulate filter material, cleaning elements, which are movable along the lamellar elements by means of resilient arms connected to a drive shaft and in permanent resilient engagement with the lamellar elements, being provided between the lamellar elements of the inner wall and extending at least into the layer of filter material adjacent this wall.

In accordance with yet another advantageous feature of the invention, the cleaning elements can be actuated in a particularly simple manner by mounting them on a drivable shaft extending along the axis of the cell.

In accordance with a still further and particularly advantageous feature of the invention, the cleaning elements are helically staggered along the shaft so that the cleaning elements are distributed over one or more complete coils. This results not only in even loading of the drive shaft for the cleaning elements, but also in uniform and simultaneous shifting of the filter material over the entire periphery of the inner wall of the filter cell.

A particularly simple construction results if the shaft has radially extending arms, to the end of each of which is secured at least one cleaning element.

Advantage also accrues if, in accordance with the invention, each cleaning element is formed by a stripping plate shaped like a ploughshare, which is rearwardly inclined in a direction opposite that of the movement of the cleaning elements. This results in the filter material being removed in a particularly efficient manner from the inner layer, and also in the lamellar elements on the inner wall of the cell being cleaned in a precise manner. After the stripping plates have swept past, there is no danger, as there is in the case where the stripping elements are pushed through the filter material, that the stripping plates will bend inwards into the cell if offered great mechanical resistance, and will therefore penetrate more deeply into the filter material which would result in the risk of destruction of not only other cleaning elements, but also the wall of the cell.

In accordance with another preferred feature of the invention, respective tapered annular chambers are connected to the top and bottom ends of the coaxially arranged gas-permeable walls. It thus becomes possible, on the one hand, to store in the upper chamber sufficient material for replacing the stripped-off material and, on the other hand, to preheat the material so that no condensate forms on the surfaces of the particles of the shifted material. The capacity of this chamber located above the filter corresponds at least to the filter material lost during a cleaning operation. Because of the presence of the lower tapered annular chamber, it becomes possible to use, in an advantageous manner, a lock or discharge opening both for the crude-gas side filter compartment and for the annular filter compartment accommodating the filter material.

The outer coaxial wall may for example be made from perforated metal sheet with close-mesh wire netting laid over its outer surface. This results, on the one hand, in small flow-resistance and, on the other, in preventing filter material from escaping into the clean-gas side.

An embodiment of the method of the invention and a form of apparatus for performing it will now be described in greater detail by reference to the accompanying drawings, in which.

Figure 1:
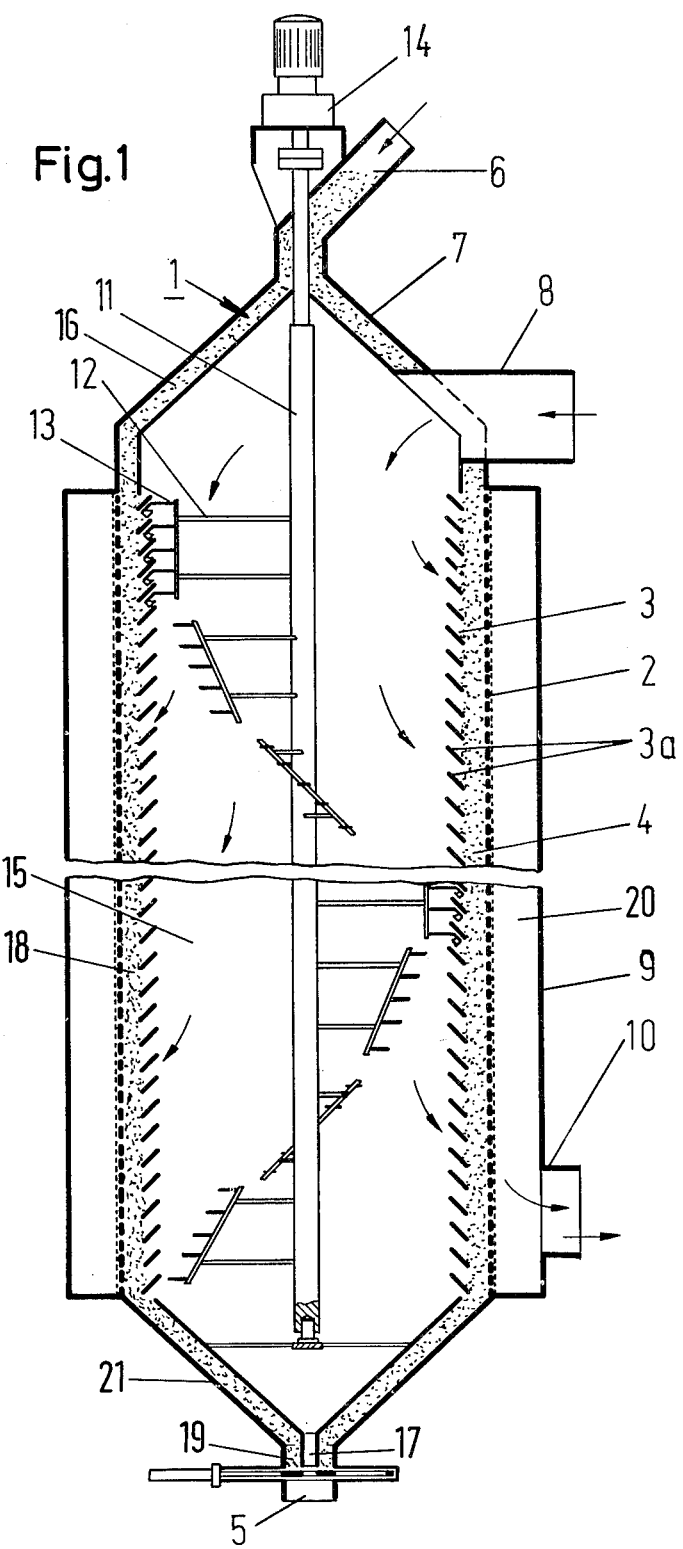
FIG. 1 is an axial vertical section through the filter arrangement in accordance with the invention.

Referring to FIG. 1, the overall gas-cleaning plant consists of a cell or filter arrangement 1, of a conveyor system (not shown), and of a regenerating system (not shown). For the purpose of cleaning the filter material, the crude-gas-side filter layer in the crude-gas-side filter compartment is periodically mechanically removed and is discharged from this compartment through a discharge opening 17, and the discharged filter material is replaced by material from an annular supply container or compartment 16. After a number of cleaning cycles, the entire filter material is discharged through an opening 19 from the filter compartment 18 containing the filtered material, and during the several cleaning cycles and the periodic emptying, an air-stream flowing counter to the stream of gas to be cleaned is introduced through the filter into the clean-gas side to prevent entry of gas. The discharged filter material is passed to a regenerating system and then back to the gas-cleaning plant. All the various steps of the method such as cleaning, voiding, regeneration and refilling, are controlled by means of a programmed circuit (not shown).

To avoid a drop below the dew point, the airstream is preheated to approximately 150° to 200° C. During the admission of the counter air current, via the counter air duct, the filter chamber is separated from the pure gas duct by the closing of a plate shut off valve. The filter material used in this particular example consists of unbroken sintered magnesite particles having a diameter of approximately 1 to 8 mm and preferably 2 to 6 mm. The filter material removed from the filtering apparatus is passed to the regenerating system and from there back to the filtering plant by means of a closed conveying system.

The filtering arrangement comprises two cylindrical coaxially arranged gas-permeable walls 2 and 3. The outer wall 2 may be of any suitable construction, the inner wall consists of annular coaxially arranged lamellar elements 3a which, in the example shown, are directed obliquely upwards at an angle of 35°. Between the walls 2 and 3 of the cell 1 is located the particulate filter material 4, the composition of which, i.e. its physical and chemical properties, is or are suited to the gases to be cleaned. For the purpose of intermittently exchanging the filter material after it has reached its saturation point, and to replace the contaminated material with a clean material, the contaminated material can be removed from the cell through a lock or opening 5 provided at the lower end of the cell 1, together with the deposited material from the crude-gas-side filter compartment 15, by way of discharge openings 17 and 19, the fresh filter material being introduced, through a feed duct 6 and a feed cone 7, into the annular chamber between the walls 2 and 3 of the filter cell 1.

The crude gas to be cleaned is passed through an inlet port 8 into the interior of the cell, and passes outwardly through the filter cell into a clean-gas filter compartment 20, delimited by an outer casing 9, from where the clean gas is carried away through a discharge port 10.

Figure 2:
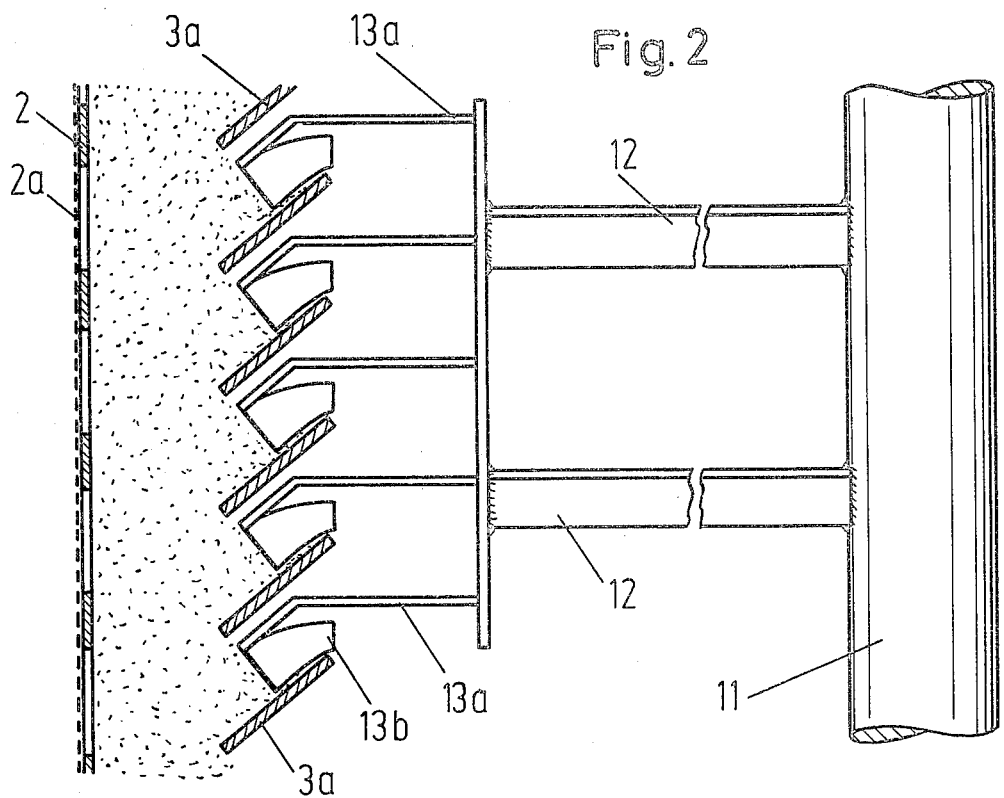
FIG. 2 shows, on a larger scale, a radial view of part of the FIG. 1 filter arrangement.
Figure 3:
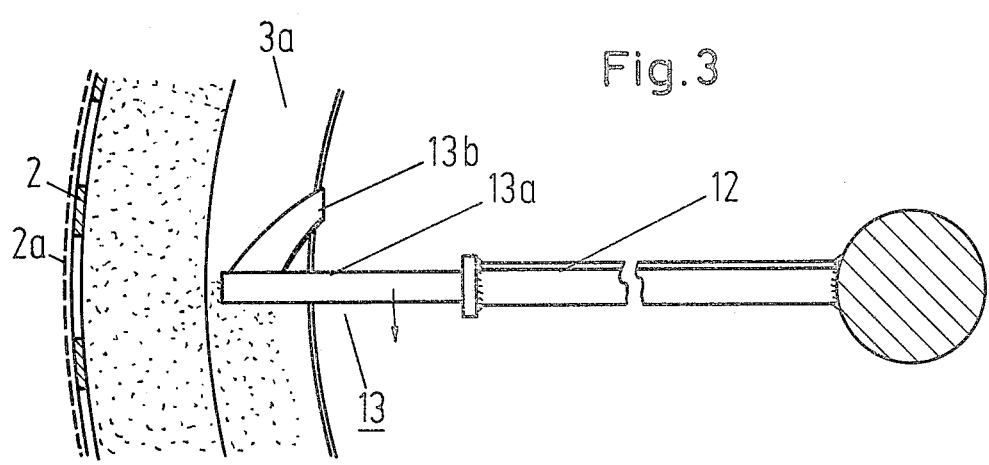
FIG. 3 is a cross-sectional plan view of a cleaning element.

The mechanical cleaning apparatus consists of a shaft 11 which extends along the axis of the cell, is arranged vertically and can be driven by a motor 14. Mounted on the shaft 11 are radial arms 12, at the end of each of which is carried at least one cleaning element designated generally by the numeral 13. These cleaning elements 13 extend between the lamellar elements 3a of the inner wall of the cell 1 and at least into the layer of filter material adjacent this wall. The construction of the cleaning elements is shown in more detail in FIGS. 2 and 3. Each cleaning element 13 consists of a carrier 13a extending radially of the shaft 11, on which carrier is provided a stripping plate 13b, shaped like a ploughshare, which extends obliquely rearwardly in a direction opposite to that in which the shaft 11 rotates.

Each radial carrier 13a may consist of a horizontal spring-steel arm which is flat so as to press the stripping plates 13b on to the underlying lamellar elements so that dust can be stripped off more efficiently. A further advantage of this arrangement resides in the fact that dimensional inaccuracies and changes in size due to temperature-dependent expansion of the materials between the cell wall 3 and the rotating stripping system 11, 12, 13, can be compensated for by the spring travel-stroke within the elastic range of the carrier 13a.

As a result of this arrangement, the stripping plates 13b, extending between the lamellar elements 3a on the inner wall of the cell and into the inner layer of filter material, shift the filter material in the inner layer as the shaft 11 rotates, and direct this material between the lamellar elements 3a and move it out of the cell, so that this filter material falls through the cylindrical interior of the cell, whereupon it is removed from the filter arrangement by way of the discharge lock 5. The stripping plates 13b, shaped like ploughshares, not only remove the most heavily contaminated filter material of the inner layer during the above-described movement, but also clean the lamellar elements 3a of the inner wall of the cell which are likewise subjected to the greatest amount of contamination.

As shown in FIG. 1, the cleaning elements 13 and therefore also the arm 12 are staggered helically along the shaft 11, so that, on the one hand, the shaft 11 is evenly loaded and, on the other hand, the filter material 4 is displaced simultaneously and uniformly over the entire periphery of the inner wall, and the displaced filter material takes up the natural angle of repose between the lamellar elements 3a of the inner wall 3 of the cell.

The cleaning elements 13 are connected to the arms 12 by means of screws, and one of the two blades forming an element is provided with a slot extending lengthwise of the element. This arrangement enables the levels of the stripping plates 13b to be precisely set.

During the mechanical cleaning operation by means of the cleaning elements moved in the manner described, it is expedient to interrupt the flow of gas for the short period during which mechanical cleaning takes place, i.e. during operation of the mechanical cleaning apparatus. For this purpose the discharge port 10 is closed on the clean-gas side and at the same time a relatively weak air-stream is caused to flow through the filter in the direction opposite to that of the flow of the gases to be cleaned, so that, on the one hand, the clean-gas side is prevented from becoming contaminated with dust and, on the other hand, leaking gas, which always occurs in large industrial plants because of the incompletely sealed gas connections, is counteracted.

Although any suitable form of outer wall 2 can be used for the cell 1, it is preferable that this be made of perforated sheet metal, around the outer surface of which is firmly wrapped wire netting 2a having a mesh of approximately 2 mm. The tapered form of the inner and outer walls at each of their ends enables a supply container 16 for the filter material to be provided, as well as a chamber 21 for discharging the contaminated filter material from the annular filter compartment. Because of the tapered form of the supply container 16, the filter material to be supplied is preheated by the crude gas flowing into this zone, whereas, due to the tapered form of the discharge chamber 21, a discharge lock can be used both for the discharge opening 19 for removing material from the annular filter compartment, and for the discharge opening 17 for removing material from the crude-gas-side filter compartment.

The described method of exchanging a particulate filter material forming the filling of a filter in a gas cleaning plant, and the described apparatus for performing the method enable the filter material to be used over a considerably longer period and thus make it possible to exchange the entire filter material less frequently, discharge of dust from the plant being avoided during the exchange of the filter material. Thus, an environmentally acceptable filtering method of high efficiency is created.

I claim:

1. A method for exchanging particulate filter material in a gas cleaning plant which includes means defining a gas-permeable filter compartment within which said filter material is contained, said compartment being defined with a crude gas side and a clean gas side, and means for passing gas to be cleaned through said filter compartment from said crude gas side to said clean side, said method comprising the steps of: periodically mechanically removing from said crude gas side of said filter compartment a layer comprising a portion of the particulate filter material contained in said filter compartment and discharging the removed portion through a discharge opening of said plant; introducing into said filter compartment from a supply compartment of said plant a supply of filter material to replace said portion removed from said crude gas side thereof; periodically emptying said filter compartment by discharging through a discharge opening of said plant the entire quantity of filter material contained within said filter compartment; passing through said filter compartment, from said clean gas side thereof in a direction counter to the direction of flow therethrough of gas to be cleaned, an air current during each said periodic emptying to prevent entry of dust through the filter compartment into the clean gas side thereof; and regenerating said filter material removed from said filter compartment and thereafter returning regenerated material to said filter compartment for recycling therethrough.

2. A method according to claim 1 wherein said steps of mechanical removal, periodic emptying, regeneration and return of said filter material are performed automatically in accordance with a predetermined program.

3. A method according to claim 1 wherein said counterflowing air current is preheated to a temperature within the range between a 150°–200° C.

4. A method according to claim 1 wherein said filter compartment is mechanically closed off from said clean air side during supply of said counter-flowing air current.

5. A method according to claim 1 wherein said filter material consists of unbroken sintered magnesite particles having a diameter of approximately 1 to 8 mm.

6. A method according to claim 5 wherein the diameter of said particles is between 2 and 6 mm.

7. A method according to claim 1 comprising conveying the filter material by means of a closed conveying system.

8. A gas cleaning plant including filter apparatus comprising: inner and outer generally vertical coaxial gas-permeable walls defining therebetween an annular filter compartment containing therein particulate filter material, said filter compartment being adapted to have radially passed therethrough gas to be cleaned by said gas cleaning plant; means for introducing particulate filter material into said filter compartment; said inner wall being defined by a plurality of generally vertically aligned annular lamellar elements which are arranged to extend at an angle generally upwardly and inwardly of said gas cleaning plant; means for removing particulate filter material from said filter compartment comprising a plurality of cleaning elements adapted to be moved along said lamellar elements; resilient arms having said cleaning elements supported thereon and holding said cleaning elements in operative relationship relative to said lamellar elements; and a drive shaft having said resilient arms mounted thereof for operatively moving said cleaning elements relative to said lamellar elements; said cleaning elements being arranged to project to between said lamellar elements and to extend at least partially into filter material contained within said filter compartment to effect removal therefrom of a layer of said filter material.

9. Apparatus according to claim 8 wherein said cleaning elements are spaced along said drive shaft in a helical arrangement, the direction of rotation of said helical arrangement of said cleaning elements corresponding to the direction of rotation of said shaft.

10. Apparatus according to claim 8 wherein each of said cleaning elements is formed as a stripping plate rearwardly inclined with respect to the direction of movement thereof.

11. Apparatus according to claim 8 further comprising means defining respective tapered annular chambers extending upwardly and downwardly from said coaxial gas-permeable walls.

12. Apparatus according to claim 8 wherein said outer gas-permeable wall is defined by perforated metal sheet having close-mesh wire netting laid over its outer surface.

* * * * *